United States Patent
Lagerqvist et al.

(10) Patent No.: US 10,694,474 B2
(45) Date of Patent: Jun. 23, 2020

(54) NETWORK NODE AND METHOD FOR MANAGING TRANSMIT POWER

(71) Applicant: TELEFONAKTIEBOLAGET LM ERICSSON (PUBL), Stockholm (SE)

(72) Inventors: Tomas Lagerqvist, Stockholm (SE); David Better, Täby (SE); Peter Nordlund, Spånga (SE); Anthony Paravati, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/768,158

(22) PCT Filed: Oct. 15, 2015

(86) PCT No.: PCT/SE2015/051090
§ 371 (c)(1),
(2) Date: Apr. 13, 2018

(87) PCT Pub. No.: WO2017/065655
PCT Pub. Date: Apr. 20, 2017

(65) Prior Publication Data
US 2018/0288711 A1    Oct. 4, 2018

(51) Int. Cl.
*H04W 52/24* (2009.01)
*H04W 52/14* (2009.01)
(Continued)

(52) U.S. Cl.
CPC ....... *H04W 52/243* (2013.01); *H04W 52/143* (2013.01); *H04W 52/20* (2013.01);
(Continued)

(58) Field of Classification Search
CPC combination set(s) only.
See application file for complete search history.

(56) References Cited

U.S. PATENT DOCUMENTS

| 7,797,013 B2 | 9/2010 | Skarby et al. | |
| 2007/0155388 A1* | 7/2007 | Petrovic | H04W 36/30 455/442 |

(Continued)

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.5.0, Sep. 2013.

(Continued)

*Primary Examiner* — Cindy Trandai
(74) *Attorney, Agent, or Firm* — Patent Portfolio Builders, PLLC (57) ABSTRACT

Method performed by a network node for reducing interference in neighboring cells. The network node operates in a communication network, which is adapted to wirelessly serve a UE via a serving Radio Access, RA, node. The network node obtains a determination of at least one of Reference Signal Received Power, RSRP, and Reference Signal Received Quality, RSRQ, from the serving RA node as received by the UE and a determination of at least one of RSRP and RSRQ from a neighboring RA node as received by the UE, when the UE is connected to the serving RA node. The network node further decides to reduce a transmit power of the serving RA node serving the connected UE, when the determined RSRP and/or RSRQ of the serving RA node is higher than the RSRP and/or RSRQ of the neighboring RA node, in order to reduce the interference in neighboring cells caused by the serving RA node.

9 Claims, 4 Drawing Sheets

```
301. Obtain a determination of RSRP
and/or RSRQ.
          │
          ▼
302. Decide to reduce the transmission
power of a serving RA node based on the
obtained determination.
          │
          ▼
303. Initiating a reduction of the transmit
power of the serving RA node based on
the decision.
```

(51) Int. Cl.
  *H04W 52/20* (2009.01)
  *H04W 52/26* (2009.01)
  *H04W 52/02* (2009.01)

(52) U.S. Cl.
  CPC ...... *H04W 52/262* (2013.01); *H04W 52/0206* (2013.01); *Y02D 70/10* (2018.01); *Y02D 70/12* (2018.01); *Y02D 70/122* (2018.01); *Y02D 70/126* (2018.01); *Y02D 70/1262* (2018.01); *Y02D 70/14* (2018.01); *Y02D 70/146* (2018.01); *Y02D 70/21* (2018.01); *Y02D 70/24* (2018.01)

(56) References Cited

U.S. PATENT DOCUMENTS

| | | | | |
|---|---|---|---|---|
| 2007/0189200 | A1* | 8/2007 | Rittle | H04W 8/245 370/328 |
| 2008/0089296 | A1* | 4/2008 | Kazmi | H04B 7/264 370/336 |
| 2008/0160918 | A1* | 7/2008 | Jeong | H04W 52/0216 455/67.11 |
| 2009/0245337 | A1* | 10/2009 | Ramachandran | H04L 1/0025 375/224 |
| 2010/0233962 | A1* | 9/2010 | Johansson | H04W 52/343 455/63.1 |
| 2012/0108282 | A1* | 5/2012 | Li | H04W 52/24 455/509 |
| 2012/0190392 | A1* | 7/2012 | Aminaka | H04W 24/02 455/501 |
| 2012/0213092 | A1* | 8/2012 | Sun | H04W 52/244 370/248 |
| 2013/0229971 | A1* | 9/2013 | Siomina | H04W 24/10 370/312 |
| 2013/0235743 | A1* | 9/2013 | Goldhamer | H04W 24/10 370/252 |
| 2013/0258895 | A1* | 10/2013 | Kim | H04J 11/0056 370/252 |
| 2013/0265889 | A1* | 10/2013 | Buckley | H01Q 1/241 370/252 |
| 2013/0301541 | A1* | 11/2013 | Mukherjee | H04W 74/0833 370/329 |
| 2013/0315157 | A1* | 11/2013 | Krishnamurthy | H04L 5/0053 370/329 |
| 2014/0024388 | A1* | 1/2014 | Earnshaw | H04W 72/02 455/452.2 |
| 2014/0126530 | A1* | 5/2014 | Siomina | H04W 52/146 370/330 |
| 2014/0128057 | A1* | 5/2014 | Siomina | H04J 3/0685 455/423 |
| 2014/0200001 | A1* | 7/2014 | Song | H04W 36/0094 455/436 |
| 2014/0200016 | A1* | 7/2014 | Siomina | H04W 24/08 455/450 |
| 2014/0219243 | A1 | 8/2014 | Meshkati et al. | |
| 2014/0242989 | A1* | 8/2014 | Cai | H04W 52/54 455/436 |
| 2014/0307703 | A1* | 10/2014 | Gaal | H04L 5/0073 370/330 |
| 2015/0024770 | A1* | 1/2015 | Gu | H04W 72/1231 455/452.2 |
| 2015/0094114 | A1 | 4/2015 | Rao et al. | |
| 2015/0181570 | A1* | 6/2015 | Sorrentino | H04W 72/1205 370/329 |
| 2015/0208248 | A1* | 7/2015 | Wang | H04W 24/02 455/446 |
| 2015/0223135 | A1* | 8/2015 | Ratasuk | H04W 16/32 455/436 |
| 2015/0223149 | A1* | 8/2015 | Liu | H04W 48/12 370/252 |
| 2016/0226690 | A1* | 8/2016 | Hessler | H04L 1/0032 |
| 2016/0269949 | A1* | 9/2016 | Burstrom | H04W 24/02 |
| 2017/0026914 | A1* | 1/2017 | Madan | H04W 52/146 |
| 2017/0118669 | A1* | 4/2017 | Qin | H04W 24/02 |
| 2017/0250786 | A1* | 8/2017 | Better | H04L 5/005 |

OTHER PUBLICATIONS

3GPP, 3rd Generation Partnership Project; Technical Specification Group Radio Access Network; Evolved Universal Terrestrial Radio Access (E-UTRA); Medium Access Control (MAC) protocol specification (Release 12); 3GPP TS 36.321 V12.6.0, Jun. 2015.
International Search Report and Written Opinion dated Jan. 19, 2016 in related International Application No. PCT/SE2015/051090.
Office Action issued in application No. 15791048.0; dated Jan. 31, 2019; 6 pages.

* cited by examiner

NETWORK NODE AND METHOD FOR MANAGING TRANSMIT POWER

TECHNICAL FIELD

Embodiments herein relate to a network node and a method therein. In particular, it relates to a method for managing transmit power of a Radio Access (RA) node.

BACKGROUND

Communication devices such as User Equipments (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, mobile terminals and/or mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

The communications network covers a geographical area which is divided into cell areas, wherein each cell area is being served by a transmission point. A cell is the geographical area where radio coverage is provided by the transmission point.

The network node may further control several transmission points, e.g. having Radio Units (RRUs). A cell can thus comprise one or more network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points. The transmission point may e.g. be a Radio Base Station (RBS), eNB, eNodeB, NodeB, B node, Base Transceiver Station (BTS), Radio Access (RA) node. The network node may e.g. also be a base station such as a Radio Base Station (RBS), eNB, eNodeB, NodeB, B node, Base Transceiver Station (BTS), Radio Access (RA) node, depending on the technology and terminology used. The network node could however also be a distributed node comprised in a cloud and being configured to control the transmission point from a distance.

The base stations may be of different classes such as e.g. macro eNodeB, home eNodeB or pico base station, based on transmission power and thereby also cell size.

Further, each network node may support one or several communication technologies. The network nodes communicate over the air interface operating on radio frequencies with the UEs within range of the network node. In the context of this disclosure, the expression Downlink (DL) is used for the transmission path from the base station to the mobile station. The expression Uplink (UL) is used for the transmission path in the opposite direction i.e. from the UE to the base station.

In 3rd Generation Partnership Project (3GPP) Long Term Evolution (LTE), base stations, which may be referred to as eNodeBs or even eNBs, may be directly connected to one or more core networks. In LTE the cellular communication network is also referred to as Evolved Universal Terrestrial Radio Access Network (E-UTRAN).

An E-UTRAN cell is defined by certain signals which are broadcasted from the eNB. These signals contain information about the cell which can be used by UEs in order to connect to the network through the cell. The signals comprise reference and synchronization signals which the UE uses to find frame timing and physical cell identification as well as system information which comprises parameters relevant for the whole cell.

A UE needing to connect to the network must thus first detect a suitable cell, as defined in 3GPP TS 36.304 v11.5.0. The UE can be in either idle state, which is also referred to as IDLE or Radio Resource Control Idle (RRC_IDLE), or in connected state, which state is also referred to as CONNECTED or Radio Resource Control Connected (RRC_CONNECTED). When the UE is in RRC_IDLE, it monitors a paging channel, which paging channel is part of a Paging Control Channel (PCCH) at a logical level, a Paging Channel (PCH) on a transport channel level and a Physical Downlink Shared Channel (PDSCH) on a physical channel level. While doing so the UE typically also performs a number of radio measurements which the UE uses to evaluate the best cell, such as Reference Signal Receive Power (RSRP), Reference Symbol Received Quality (RSRQ) or Received Signal Strength Indicator (RSSI). This is performed by measuring on received reference signals and/or parts of a spectrum which comprises reference signals sent by cells. This may also be referred to as "listening" for a suitable cell.

A suitable cell is commonly a cell which has RSRQ or RSRP above a certain level. The cell with the highest RSRP or RSRQ may be referred to as the best cell or the best suitable cell. Listening for a suitable cell may comprise searching for reference signals transmitted from the network node in an Orthogonal Frequency-Division Multiplexing (OFDM) subframe. When the best suitable cell is found the UE performs random access, according to a system information for the cell. This is done in order to transmit a Radio Resource Control (RRC) connection setup request to the network node. Assuming the random access procedure succeeds and the network node receives the request, the network node will either answer with an RRC connection setup message, which acknowledges the UE's request and tells it to move into RRC_CONNECTED state, or an RRC Connection reject, which tells the UE that it may not connect to the cell. In RRC_CONNECTED state the parameters necessary for communication between the network node and the UE are known to both entities and a data transfer between the two entities is enabled.

When the UE is in RRC_CONNECTED state the UE continues to measure RSRP, as an input to connected mode mobility decisions, such as e.g. deciding when to perform a handover from one cell to another. These measurements are typically performed in the full bandwidth of the subframe, which may also be referred to as the full spectrum.

RSRP is a measurement of the signal strength of an LTE cell which helps the UE to rank the different cells according to their signal strength as input for handover and cell reselection decisions. The RSRP is an average of a power of all resource elements which carry Cell-specific Reference Signals (CRS) over the entire bandwidth. The RSRP is therefore only measured in OFDM symbols carrying CRS.

Signal-to-Noise Ratio (SNR) is a measure which compares the level of a desired signal S to the level of background noise N. SNR is defined as the ratio of signal power to the noise power, often expressed in decibels. A ratio higher than 1:1, which may also be referred to as the SNR being greater than 0 dB, indicates more signal than noise.

The signal-to-noise ratio, the bandwidth, and the channel capacity of a communication channel are connected by a ShannonHartley theorem. According to Shannon, the maximum possible bit rate C over a radio transmission link depends on the SNR as follows:

$$C = \log_2(1 + S/N)$$

The highest possible SNR is further limited by an Error Vector Magnitude (EVM) which is a measure of how far away an actual complex transmission symbol is from its ideal location in the complex constellation. The EVM may be caused by a number of sources such as filter delay, insertion loss, phase noise in synthesizers, radio channel variations, and clipping of the transmitted signal. The highest possible SNR is given from the limitations in the transmitting radio, which limitations may be referred to as Error Vector Magnitude EVM. A majority of the EVM is however due to clipping in the radio.

When radio is operated close to its max power capability, the available peak-to-average-ratio (PAR) will be limited. When the transmit signal exceeds the available PAR the transmit signal will be clipped. The clipping is also done to facilitate higher mean output power which is advantageous on especially longer distances. This clipping introduces a significant amount of in-band noise as well as out-of-band spurious emissions resulting which results in a distortion in the transmit signal, e.g. the symbols in the constellation plane is offset by a vector corresponding to the transmit EVM. Hence, clipping of the signal may lead to increased EVM, which in turns means, for example, a lower possible maximum bit rate. When EVM increases, the UE will at some point have difficulties telling one symbol from another. This is especially the case for higher order modulations where the symbols in the constellation plane has a dense pattern.

In order to support the UE in connecting to a cell, which may also be referred to as accessing a cell, System Information Blocks (SIBs) are transmitted in a control channel, such as e.g. a Broadcast Control Channel (BCCH) logical channel in the downlink, which may be mapped to the PDSCH physical channel. In LTE a number of different SIBs are defined, which are characterized by the information they are carrying. For example, cell access related parameters, such as information about the operator of the cell, restrictions to what users may access the cell and the allocation of subframes to uplink/downlink are carried by SIB1. SIB1 further carries information about scheduling of other SIBs.

In order to reduce power consumption of the UE, Discontinous Reception (DRX) may be implemented. The basic mechanism in DRX is a configurable DRX cycle, which may also be referred to as a DRX pattern, in the UE. With a DRX cycle configured, the UE only monitors the control signaling during an onDuration interval of the DRX cycle. The onDuration interval may be one or more subframes, which may be referred to as an active subframe or active subframes. In the remaining subframes of the DRX cycle, the UE may switch off its receiver, which may also be referred to as the UE sleeping or as an offDuration interval of the DRX cycle. This allows for a significant reduction in power consumption, i.e. the longer the DRX cycle and the shorter the onDuration interval, the lower the power consumption will be. In some situations, if the UE has been scheduled and active with receiving or transmitting data in one subframe, it is likely that it will be scheduled again in the near future. Waiting until the next active subframe according to the DRX cycle may lead to additional delays in transmission. Hence, to reduce delays, the UE may remain in the active state for a certain configurable time after being scheduled, this may also be referred to as the active time or the DRX-InactivityTimer, as defined in 3GPP TS36.321 Ch3.1. The duration of the active time is set by an inactivity timer, which is the duration in downlink subframes that the UE waits before it switches off and re-enters offDuration from the last successful decoding of a Physical Downlink Control Channel (PDCCH). The UE may restart the inactivity timer after a single successful decoding of a PDCCH for a transmission. The time it takes for the UE to re-enter offDuration after the last transmission may also be referred to as the inactivity time.

CRS are UE known symbols that are inserted in a Resource Element (RE) of a subframe of an OFDM time and frequency grid and broadcasted by the network node via a RA node. Each RE has an extension in the frequency domain corresponding to an OFDM sub carrier and an extension in the time-domain corresponding to an OFDM symbol interval.

The CRSs are used by the UE for downlink channel estimation. Channel estimation is used for demodulation of downlink data both when the UE is in an RRC_CONNECTED state and is receiving user data and when the UE is in an RRC_IDLE state and is reading system information.

Due to the latter use case, the CRSs must be transmitted even from cells which do not have any UEs in RRC connected state since the network node cannot know whether a UE wants to access the network until it performs random access. Downlink CRSs are inserted within the first and third last OFDM symbol of each slot with a frequency domain spacing of six sub-carriers. A slot is a time period of the OFDM time and frequency grid, which is usually 0.5 msec long. A problem with the known technology is therefore that cells without any UEs in RRC connected state still consume power due to CRS broadcasting.

In case several antennas are used by the network node for transmitting and each antenna is representing a cell, each antenna has to transmit a unique reference signal in order for the UE to connect to that specific cell. When one antenna transmits, the other antennas have to be silent in order not to interfere with the first antennas reference signal. The CRS may be non-shifted or shifted. In the non-shifted configuration the same time and frequency resources are used for CRS transmission in all cells. Hence the CRS of the cells may interfere with each other. To reduce the interference of reference signals between the cells, the position of the CRS may however be shifted in frequency between the cells, which may be referred to as shifted CRS. The CRS may be shifted between 0-5 sub carriers, each sub carrier corresponding to a frequency shift of 15 kHz for LTE. The frequency shift may be derived from the physical Cell Identity (Cell ID) which is signaled to the UE by selection of appropriate Primary Synchronization Channel (PSCH) and Secondary Synchronization Channel (SSCH).

Although this reduces the interference of reference symbols, such as CRS symbols, between cells, it has the problem that the reference symbols of one cell will disturb PDSCH and PDCCH symbols of neighboring cells.

Hence, even though cells do not have any UEs in RRC_CONNECTED state, disturbance may impact UE DL throughput in neighboring cells. This will especially be the case when the UE is in and/or close to borders between cells.

Reducing the power of the CRS may mitigate this problem. However, in order to access a cell the UE must be able to hear the CRS of the cell, i.e. the UE must be able to recognize and receive the CRS transmitted from the cell. Therefore reducing the power of the CRS also shrinks the size of the cell, since more distant UEs no longer will hear the CRS sent by the cell. Furthermore, the quality of the channel estimates used for demodulation decreases when the Signal to Interference Ratio (SINR) on the CRS decreases. Reducing the power of the CRS therefore causes degradation of cell edge performance. This degradation is further aggravated when the load in the network increases, especially if the data is transmitted with higher power than the CRS, which is usually the case when the effect of CRS interference is to be reduced, thus, leading to a reduced performance of the wireless communication network.

SUMMARY

It is therefore an object of embodiments herein to enhance the performance in a communications network of the type described above.

According to a first aspect of embodiments herein, the object is achieved by a method performed by a network node for reducing interference in neighboring cells. The network node operates in a communication network, which network is adapted to wirelessly serve a User Equipment (UE) via a Radio Access (RA) node. The network node obtains a determination of at least one of Reference Signal Received Power, RSRP, and Reference Signal Received Quality, RSRQ, from the serving RA node as received by the UE and a determination of at least one of RSRP and RSRQ from a neighboring RA node as received by the UE, when the UE is connected to the serving RA node. The network node further decides to reduce a transmit power of the serving RA node, when the determined RSRP and/or RSRQ of the serving RA node is higher than the RSRP and/or RSRQ of the neighboring RA node. This is performed in order to reduce the interference in neighboring cells caused by the serving RA node.

According to a second aspect of embodiments herein, the object is achieved by a network node configured to perform a method for reducing interference to neighboring cells. The network node operates in a communication network, which network is adapted to wirelessly serve a User Equipment (UE) via a Radio Access (RA) node. The network node is configured to obtain a determination of at least one of Reference Signal Received Power, RSRP, and Reference Signal Received Quality, RSRQ, from the serving RA node as received by the UE and a determination of at least one of RSRP and RSRQ from a neighboring RA node as received by the UE, when the UE is connected to the serving RA node. The network node is further configured to decide to reduce a transmit power of the serving RA node, when the determined RSRP and/or RSRQ of the serving RA node is higher than the RSRP and/or RSRQ of the neighboring RA node. This is performed in order to reduce the interference in neighboring cells caused by the serving RA node.

One advantage of the embodiments disclosed herein is that they allow the network node to reduce, which may also be referred to as back down, the transmit power of the RA node when scheduling a UE, without impacting mobility for UEs in the system. By only reducing the transmit power when the RSRP and/or RSRQ of the RA node serving the UE, which may also be referred to as the serving RA node, is higher than the RSRP and/or RSRQ of the neighboring RA node, the interference in neighboring cells may be reduced while preventing the UE from performing a handover to the neighboring cell. Thereby, the transmission power of the RA node may be adapted to the different needs of UEs situated close to the cell center with high receiver signal and of UEs situated at the cell edge which have a low receiver signal.

By reducing the transmit power the RA node is further able to run with a lower EVM, hence impacting the maximum SNR possible in the system. This will allow for higher throughput.

A further benefit with embodiments herein, is that the power consumption in the RA node is also reduced.

BRIEF DESCRIPTION OF THE DRAWINGS

Examples of embodiments herein are described in more detail with reference to attached drawings in which.

DETAILED DESCRIPTION

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 1:
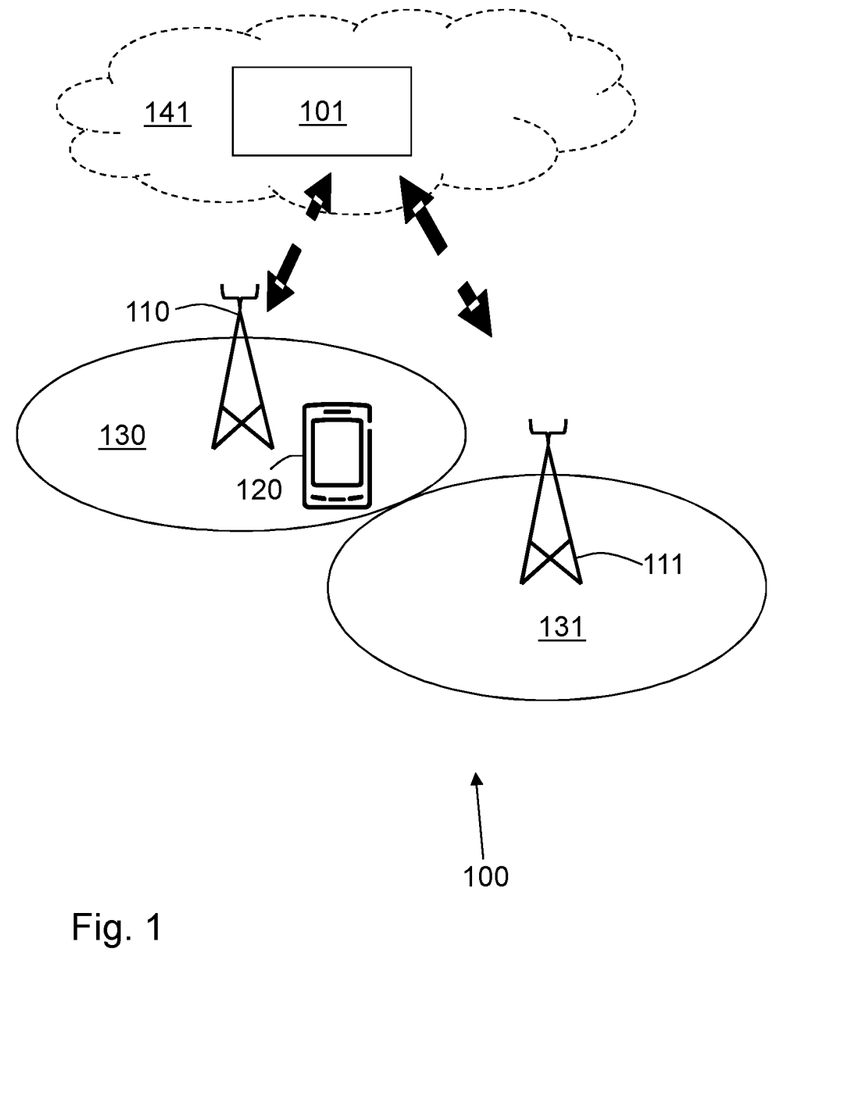
FIG. 1 is a schematic block diagram illustrating embodiments of a communications network.

FIG. 1 depicts an example of a communications network 100 adapted to wirelessly serve a UE 120 according to a first scenario in which embodiments herein may be implemented. The communications network 100 may be a wireless communication network such as an LTE, E-Utran, WCDMA, GSM network, any 3GPP cellular network, Wimax, or any cellular network or system.

The communications network 100 comprises a plurality of radio access (RA) nodes whereof two, a first RA node 110 and a second RA node 111 are depicted in FIG. 1. The first RA node 110 and the second RA node 111 are network nodes which each may be a transmission point such as a radio base station, for example an eNB, an eNodeB, or an Home Node B, an Home eNode B or any other network node capable to wirelessly serve a wireless terminal such as a user equipment or a machine type communication device in a wireless communications network. The first RA node 110 and the second RA node 111 each serves a cell 130, 131.

The communication network 100 further comprises a network node 101 which is configured to communicate with at least one RA node 110, 111. The network node 101 may be a distributed node where the functionality is comprised in a first cloud 141. The network node 101 and the functionality of the network node 101 may however also be comprised in or comprise the RA node 110.

The wireless communications network 100 comprises a UE 120. The first RA node 110 and the second RA node 111 may each be a transmission point for the UE 120. The UE 120 is within radio range of the first RA node 110 and the second RA node 111, this means that it can hear signals from the first RA node 110 and the second RA node 111.

The UE 120 may e.g. be a wireless terminal, a wireless device, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term wireless terminal used in this document also covers other wireless devices such as Machine to machine (M2M) devices.

Figure 2:
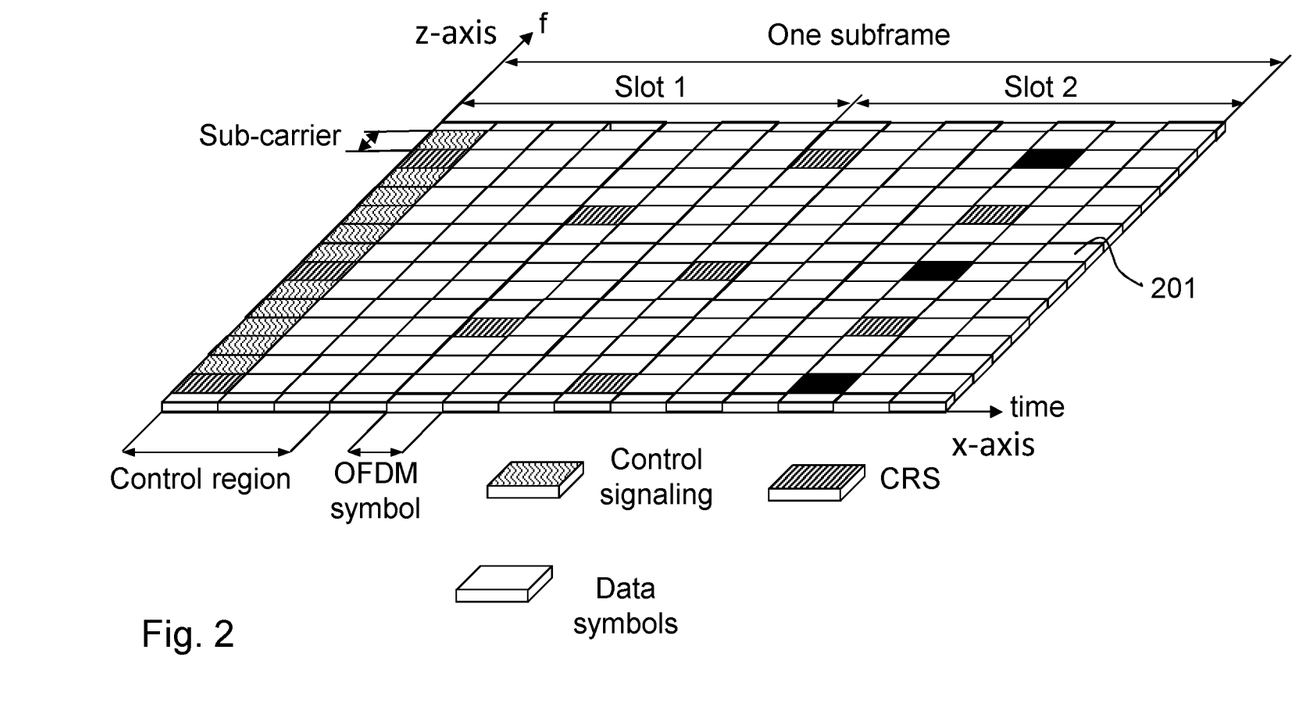
FIG. 2 is a schematic block diagram illustrating embodiments of an OFDM subframe.

FIG. 2 shows an exemplary downlink OFDM time and frequency grid, which is also referred to as an OFDM subframe. Each subframe comprises two slots. Each slot comprising a number of resource elements (RE) 201 extending both in the time domain (x-axis) and in the frequency domain (z-axis). Each RE's 201 extension in the frequency domain is referred to as a sub-carrier whereas the extension in the time domain is referred to as an OFDM symbol. In the time domain, LTE downlink transmissions are organized into radio frames of 10 ms, wherein each radio frame comprises ten equally-sized subframes. Furthermore, the resource allocation in LTE is typically described in terms of Physical Resource Blocks (PRBs), comprising a plurality of REs. A resource block corresponds to one slot in the time domain and 12 contiguous subcarriers in the frequency domain.

Downlink and uplink transmissions are dynamically scheduled, i.e. in each subframe the network node 130 transmits control information about to or from which UE 120 data is transmitted and upon which resource blocks the data is transmitted. The control information may comprise system information, paging messages and/or random access response messages. The control information for a given UE 120 is transmitted using one or multiple Physical Downlink Control Channels (PDCCH). Control information of a PDCCH is transmitted in the control region of each subframe. FIG. 2 shows an exemplary size of a normal control region of three OFDM symbols allocated for control signaling, for example the PDCCH. The size of the control region may however be dynamically adjusted according to the current traffic situation. In the example shown in the figure only the first OFDM symbol out of the three possible is used for control signalling. Typically the control region may comprise many PDCCHs carrying control information to multiple UEs 120 simultaneously. The REs used for control signaling are indicated with wave-formed lines and REs used for CRS are indicated with diagonal lines.

The CRS are used by the UE 120 for downlink channel estimation. Channel estimation is used for determining the demodulation of downlink data both when the UE 120 is in RRC connected state and is receiving user data and when the UE 120 is in RRC idle state and is reading system information. Downlink CRS are inserted within the first and third last OFDM symbol of each slot with a frequency domain spacing of six sub-carriers.

The subframe also comprises data symbols used for transmitting user data between the network node 101 and the UE 120. The data symbols are situated in the region following the control region, which is also referred to as the data region.

Figure 3:
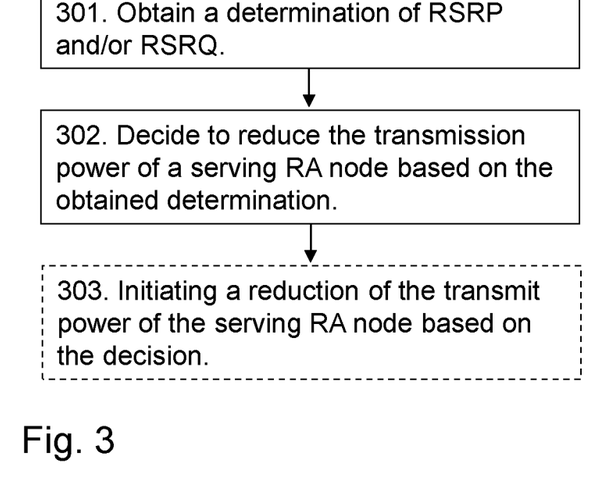
FIG. 3 is a flowchart depicting embodiments of a method in a network node.

Example of embodiments of a method in the network node 101 for reducing interference in neighbouring cells, will now be described with reference to a flowchart depicted in FIG. 3. The network node 101 operates in a communication network 100 which is adapted to wirelessly serve a UE 120 via at least a RA node 110, 111.

The method comprises the following actions, which actions may be taken in any suitable order. Dashed lines of a box in FIG. 3 indicate that this action is not mandatory.

Action 301

The network node 101 obtains a determination of at least one of a RSRP and a RSRQ from the serving RA node 110, as received by the UE 120 when the UE 120 is connected to the serving RA node 110. The network node 101 further obtains a determination of at least one of RSRP and RSRQ from a neighboring RA node 111, as received by the UE 120 when the UE 120 is connected to the serving RA node 110. The determination is performed when the UE 120 is connected to the serving RA node 110.

In some embodiments herein the obtained determination of the RSRP and/or RSRQ may be based on a measurement of the UEs 120 RSRP and/or RSRQ from the serving RA node 110 and from a neighboring RA node 111. The measurement may be performed by the UE 120 and forwarded to the network node 101 via the RA node 110.

RSRP and/or RSRQ may for example be measured at the UE 120 by applying a periodic measurement, such as an A5 or an A3 measurement, and look at both the serving and neighboring RA nodes RSRP and/or RSRQ values.

Action 302

When the network node 101 has obtained a determination of RSRP and RSRQ, the network node 101 decides to reduce a transmit power of the RA node 110 serving the connected UE 120, when the determined RSRP and/or RSRQ of the serving RA node 110 is higher than the RSRP and/or RSRQ of the neighboring RA node 111. By reducing the transmit power of the RA node 110 when the determined RSRP and/or RSRQ is higher than the RSRP and/or RSRQ of the neighboring RA node 111, the interference in neighboring cells caused by the RA node 110 is reduced while at the same time reducing the risk that the UE 120 performs an unwanted hand over to a neighboring node. An unwanted hand over may be performed by the UE 120 if the measured RSRP and/or RSRQ for the neighboring node is higher than for the serving node, since the UE will rank the neighboring node 111 as best server as it provides a better signal. Since the signal from the RA node 110 fades with distance the RSRP and/or RSRQ may be used as a measure of the UEs distance from the RA node 110. A low RSRP and/or RSRQ may be a sign of the UE 120 being close to the cell edge while a high RSRP and/or RSRQ may be a sign of the UE 120 being close to the RA node 110 in the cell center. By reducing the output power for users with a high RSRP and/or RSRQ, which are close to the cell center, interference to neighboring cells is reduced. Further, the reduction of the transmit power will reduce EVM which increases the throughput of the channel. For users with a low RSRP and/or RSRQ, which may be located at the cell edge, it is however beneficial to transmit with max output power since the throughput for these UEs is not limited by EVM.

In some embodiments herein, the network node 101 may decide to reduce the transmit power of the serving RA node 110, when the determined RSRP and/or RSRQ of the serving RA node 110 is at least a predefined value higher than the RSRP and/or RSRQ of the neighboring RA node 111. By applying the predefined value, a margin is created between the RSRP and/or RSRQ values of the serving RA node 110 and the neighboring RA node 111, which reduces the risk that the RSRP and/or RSRQ for the neigboring RA node 111 are higher than the corresponding values of the serving RA node 110 when reducing the transmit power for the serving RA node 110.

In some embodiments herein, the predefined value may be more than 1.5 dB higher than the RSRP and/or RSRQ of the neighboring RA node 111.

In some further embodiments herein the predefined value may be at least 2 dB higher than the RSRP and/or RSRQ of the neighboring RA node 111. In a further embodiment herein the predefined value may be not be more than 3 dB higher than the RSRP and/or the RSRQ of the neighboring node 111.

By selecting the predefined value in the range of 2-3 dB higher than the RSRP and/or the RSRQ of the neighboring node 111, the risk of an unwanted handover is further reduced since the measured RSRP and/or RSRQ will always be the predetermined value higher than the RSRP and/or RSRQ higher than the neighboring node.

The difference between the serving and neighboring RA nodes RSRP and/or RSRQ values may be used as an indication of how much the power may be reduced without risking unwanted handovers for that specific UE 120. Care should be taken in order not to reduce the transmit power if it might impact mobility of the UE 120. As an example, if the transmit power of the RA node 110 is reduced with 3 dB, the RSRP and/or RSRQ measurements of the serving RA node 110 will also be 3 dB lower. Hence, neighboring cells will become 3 dB stronger relative to the serving cell, which may force the UE to initiate a handover to the neighboring cell. The reduction of the transmit power may also be referred to as de-boosting.

In some embodiments herein the RSRP and/or RSRQ margin toward neighboring cells may only be evaluated for UEs 120 that are awake in the TTI, i.e. a UE in DRX sleep will not be impacted when the network node decides to reduce the transmit power. It shall be noted that some UEs 120 may be awake some time before or after the DRX on duration time. The network node 101 therefore also needs to take this into account, by e.g. obtaining measurements on UEs 120 that are not yet in the DRX onDuration.

Action 303

The network node 101 may further initiate a reduction of the transmit power of the serving RA node 110, when the UE 120 is scheduled.

In some embodiments herein the reduction of the transmit power of the RA node 110 to the UE 120 may be initiated for PRBs comprising CRS and/or data.

In some further embodiments herein, the reduction of transmit power for PRBs comprising data is initiated when a Block Error Rate, BLER, for the UE 120 is below a threshold and has been below the threshold for a predetermined period of time. The BLER is a rate of the number of erroneous blocks to the total number of received blocks.

In some further embodiments herein, the reduction of transmit power may be initiated for PRBs comprising data when a more robust Modulation and Coding Scheme, MCS, is available for the UE 120. A more robust MCS may e.g. be available when there are unused PRBs available in the frequency domain on which data may be transmitted.

In embodiments herein the initiating of a reduction of transmit power for PRBs comprising data when a more robust MCS is available for the UE 120 may further comprise initiating an increase in the number of PRBs comprising the data which reduces the coding rate of the transmission. By increasing the number of PRBs on which data is sent the redundancy is increased, which increases the probability that the data will be correctly received at the receiver even though the transmit power is reduced. Hence, a more robust MCS may be selected for transmission in order to allow the transmit power to be reduced, in order to reduce the interference in neighboring cells while limiting the risk of loosing data during the transmission.

In some embodiments herein, when no UEs are scheduled, transmit power of the CRSs for UEs that are listening to the cell may be reduced.

In some embodiments herein, the reduction of the transmit power of the RA node 110 to the UE 120 may be initiated for all PRBs comprising CRS and/or data, except for the PRBs used for mobility measurements. The number of PRBs used for mobility measurements is set in the system information element (IE) AllowedMeasBandwidth. Tests have shown that the highest gain is achieved when the six center PRBs are used for mobility measurements, which is indicated in the system information when the IE AllowedMeasBandwidth is set to mbw6. Hence in the above mentioned embodiment, full power CRS and data may be transmitted in the center 6 PRBs, in order not to impact mobility measurements for UEs camping on or connected to surrounding cells. Thereby intra and inter-frequency RSRP and/or RSRQ measurements remain unaffected by a transmit power reduction.

When there are no UEs to be scheduled in a Transmission Time Interval (TTI) and the RSRP and/or RSRQ for the serving RA node 110 is above the corresponding values for the neighboring RA node 111 for all UEs that are awake, then the network node 101 may initiate a reduction of the power of the CRSs except for the center 6 PRBs in which the RA node transmits random access response messages.

CRS and data are usually transmitted with the same power. Hence, if CRSs are transmitted with full power due to idle mode UEs listening on the RA node, the data may also be transmitted with full power.

Figure 4:
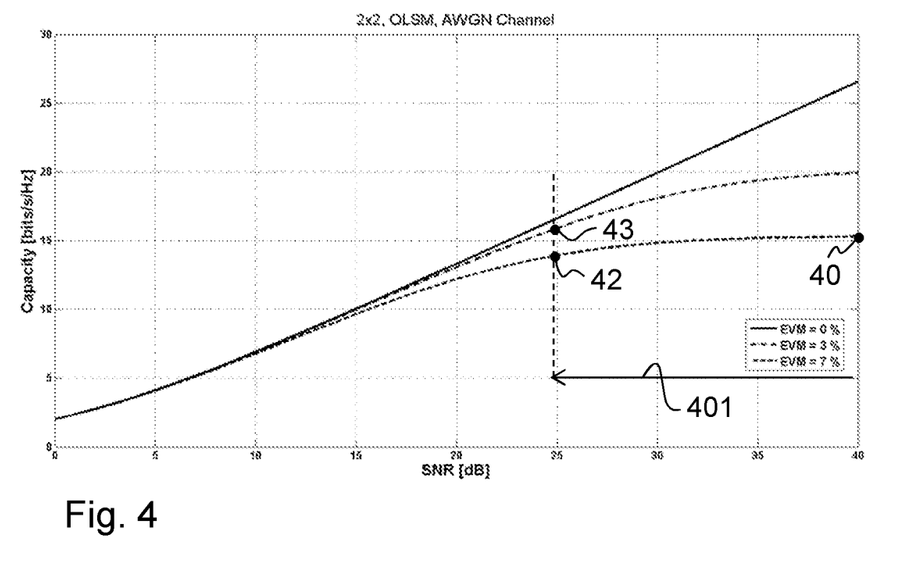
FIG. 4 is a diagram depicting a MIMO channel capacity for different EVM and SNR on the radio channel.

When there are UEs 120 to be scheduled and the RSRP and/or RSRQ for the serving RA node 110 is above the corresponding values of the neighboring RA node 111, the network node may initiate an increase of the number of PRBs or reduce the MCS used in order to use a lower code rate and reduce the transmit power. As an example it would be possible to increase the number of PRBs scheduled for a specific UE with 100%, e.g. by scheduling the transmission over a 20 MHz bandwidth instead of a 10 MHz bandwidth, and reducing the transmit power by e.g. 3 dB. This will give gains to neighboring cells since the interference will be reduced. If a high MCS is used, which corresponds to a higher order modulation scheme such as e.g. 256 QAM, and all PRBs are used, it may still be possible to decrease transmit power without reducing the MCS, if a Signal to noise ratio (SNR) is limited due to an Error Vector Magnitude (EVM). This may increase throughput and on the same time decrease interference to neighboring cells. Such a scenario is depicted in FIG. 4. The possible bitrate in a radio transmission link, which is shown on the y-axis, is depending on the SNR, which shown on the x-axis. The highest possible bitrate for a channel is given from the limitations in the Radio, which limitation may be referred to as EVM. The EVM may originate from e.g. clipping in the radio, phase noise in synthesizers, filter delay etc. A majority of the EVM is however due to clipping of the transmission signal. The clipping is done to facilitate higher mean output power which is advantageous especially on longer distances, however this also lowers the possible maximum bitrate since the EVM will be worse. If the bit rate is limited by EVM, reducing the transmit power for will reduce the impact of clipping and reduce the EVM. Hence, the maximum possible bit rate increases. As can be seen in the FIG. 4, the capacity of the channel drastically reduces when the EVM increases. For an ideal transmitter where the EVM is 0% the possible bitrate increases with an increased transmit power. However, for an EVM of 7% the bitrate only increases with an increased transmit power up to a SNR of about 25 dB, thereafter the curve flattens out which means that a further increased transmit power does not generate an increased bitrate. Hence, it can be clearly seen that independent of how much SNR is increased over 30 dB with 7% EVM, the increase in throughput will be minor. It may therefore be advantageous to reduce the transmit power for channels with a high EVM, since this will reduce the interference in neighboring cells while having a very limited negative effect on the bitrate, which may also be referred to as the throughput of the channel. As can be seen in FIG. 4, a reduction of the transmit power will reduce the SNR. A reduction of the SNR from 40 dB to 25 dB, as indicated by the arrow 401, will reduce the bitrate from 26.5 bits/s/Hz to 16 bits/s/Hz when EVM is 0%, but only from 15 bits/s/Hz, as indicated by the position 40, to 14 bits/s/Hz, as indicated by the position 41, when the EVM is 7%. However, a reduction of the transmit power also reduces EVM, which will increase the possible bitrate in the channel. If the power reduction leads to EVM being reduced to 3%, the available bitrate will move from the 14 bits/s/Hz, as indicated by position 42 in FIG. 4, to 15.5 bits/s/Hz as indicated by position 43 in FIG. 4. Hence, although the transmit power is reduced the throughput of the channel will increase. Therefore, the reduction of transmit power not only leads to a reduced interference experienced by neighboring cells but also to an increased throughput in the serving cell.

Figure 5:
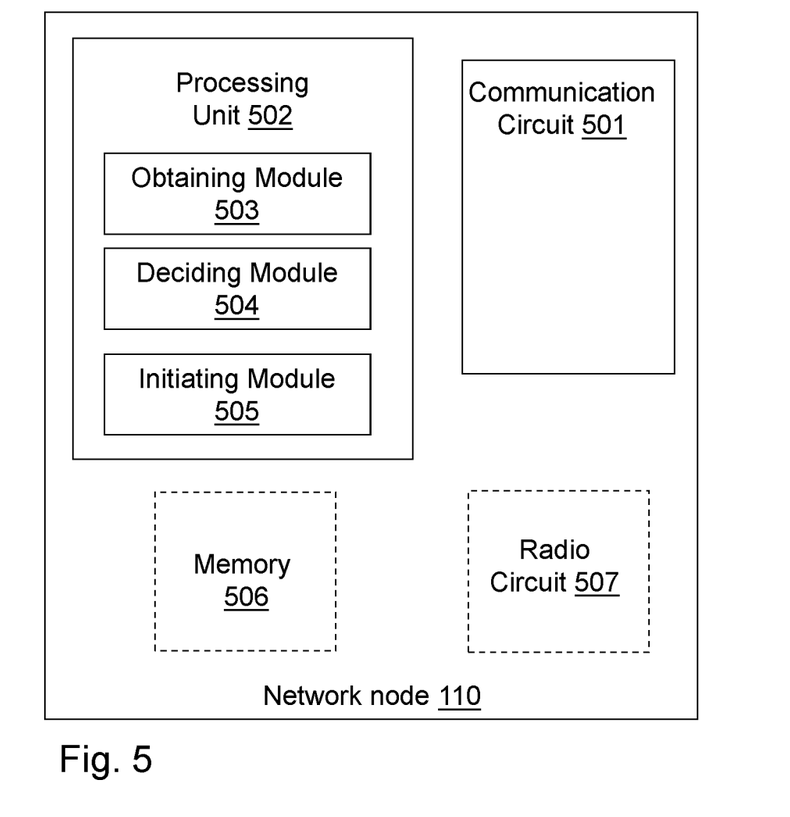
FIG. 5 is a schematic block diagram illustrating embodiments of a network node.

To perform the method actions for reducing interference in neighbouring cells described above in relation to FIG. 3, the network node 101 may comprise the following arrangement depicted in FIG. 5. As mentioned above the network node 101 operates in a communication network 100 which is adapted to wirelessly serve a UE 120 via at least a RA node 110.

The network node 101 comprises a communication circuitry 501 to communicate with other network nodes, such as e.g. RA nodes 110, 111, and a processing unit 502.

The network node 101 is configured to, e.g. by means of an obtaining module 503 being configured to, obtain a determination of a RSRP and/or a RSRQ between the UE 120 and the serving RA node 110 and the UE 120 and a neighboring RA node 111, for a UE 120 which is connected to and served by the RA node 110. The network node 101 is further configured to, or comprises a deciding module 504 configured to, decide to reduce a transmit power of the RA node 110 serving the connected UE 120, when the determined RSRP and/or RSRQ of the serving RA node 110 is higher than the RSRP and/or RSRQ of the neighboring RA node 111, in order to reduce the interference in neighboring cells caused by the RA node 110.

The network node 101 may further be configured to, e.g. by means of the deciding module 504 further being configured to, decide to reduce the transmit power of the RA node 110 serving the connected UE 120, when the determined RSRP and/or RSRQ of the serving RA node 110 is at least a predefined value higher than the RSRP and/or RSRQ of the neighboring RA node 111. In some embodiments herein, the network node 101 may further be configured to, e.g. by means of the deciding module 504 further being configured to, decide to reduce the transmit power when the determined RSRP and/or RSRQ of the serving RA node 110 is more than 1.5 dB higher than the RSRP and/or RSRQ of the neighboring RA node 111, i.e. the predefined value is 1.5 dB higher than the RSRP and/or RSRQ of the neighboring RA node 111.

In some embodiments herein, the network node 101 may further be configured to, e.g. by means of the deciding module 504 further being configured to, decide to reduce the transmit power when the determined RSRP and/or RSRQ of the serving RA node 110 is at least 2 dB higher than the RSRP and/or RSRQ of the neighboring RA node 111, i.e. the predefined value is at least 2 dB higher than the RSRP and/or RSRQ of the neighboring RA node 111.

In another embodiment herein the network node 101 may further be configured to, e.g. by means of an initiating module 505 being configured to, initiate a reduction of the transmit power of the RA node 110 to the UE 120.

In some embodiments herein, the network node 101 may be configured to, e.g. by means of the initiating module 505 further being configured to, initiate a reduction of the transmit power of the RA node 110 to the UE 120 for Physical Resource Blocks, PRBs, comprising Cell Reference Symbols, CRS, and/or data.

In some embodiments herein, the network node 101 may be configured to, e.g. by means of the initiating module 505 further being configured to, initiate a reduction of the transmit power for PRBs comprising data when a Block Error Rate, BLER, for the UE 120 is below a threshold and has been below the threshold for a predetermined period of time.

In some embodiments herein, the network node 101 may be configured to, e.g. by means of the initiating module 505 further being configured to, initiate a reduction of the transmit power for PRBs comprising data when a Block Error Rate, BLER, for the UE 120 is below a threshold and has been below the threshold for a predetermined period of time.

In further embodiments herein, the network node 101 may be configured to, e.g. by means of the initiating module 505 further being configured to, initiate a reduction of transmit power for PRBs comprising data when a more robust Modulation and Coding Scheme, MCS, is available for the UE 120. In some embodiments the network node 101 is further configured to, e.g. by means of the initiating module 505 further being configured to initiate an increase in the number of PRBs comprising the data when a more robust MCS is available for the UE 120.

In a further embodiment herein, the network node 101 may be configured to, e.g. by means of the initiating module 505 further being configured to, initiate the reduction of the transmit power of the RA node 110 to the UE 120 for all PRBs comprising CRS and data, except for PRBs used for mobility measurements. In some embodiments herein, the six center PRBs are used for mobility measurements.

In some embodiments herein the network node 101 may be a distributed node, e.g. comprised in a cloud. The distributed node being configured to communicate with one or more RA nodes 110, 111 by means of the communication circuit 501.

In some further embodiments herein, the network node 101 may be implemented together with the serving RA node 110. This may e.g. be implemented by the network node 101 being comprised in the RA node 110 or the RA node 110 being comprised in the network node 101. In this embodiment the network node 101 may further comprise a radio circuitry 507 to communicate with UEs 120.

The embodiments herein for reducing interference in neighbouring cells may be implemented through one or more processors, such as the processing unit 502 in the network node 101 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the network node 101. One such carrier may be in the form of a CD ROM disc. It is however feasible with other data carriers such as a memory stick. The computer program code may furthermore be provided as pure program code on a server and downloaded to the network node 101.

The network node 101 may further comprise a memory 506 comprising one or more memory units. The memory 506 is arranged to be used to store obtained information, measurements, data, configurations, schedulings, and applications to perform the methods herein when being executed in the network node 101.

Those skilled in the art will also appreciate that the obtaining module 503, the deciding module 504 and the initiating module 505 described above may refer to a combination of analog and digital circuits, and/or one or more processors configured with software and/or firmware, e.g. stored in the memory 506, that when executed by the one or more processors such as the processing unit 502 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a network node for reducing interference in neighboring cells, the method comprising:
   obtaining, by the network node, measurements on User Equipments (UEs) that are not yet in a Discontinuous Reception (DRX) onDuration, wherein the network node operates in a communication network that is adapted to wirelessly serve a UE via a serving Radio Access (RA) node,
   obtaining, by the network node, a determination of at least one of Reference Signal Received Power (RSRP) and Reference Signal Received Quality (RSRQ) from the serving RA node as received by the UE and a determination of at least one of RSRP and RSRQ from a neighboring RA node as received by the UE, when the UE is connected to the serving RA node, wherein the UE is one of the UEs that are not yet in the DRX onDuration,
   deciding, by the network node, to reduce a transmit power of the serving RA node, when the determined at least one of the RSRP and the RSRQ of the serving RA node is at least a predefined value higher than the determined at least one of the RSRP and the RSRQ of the neighboring RA node, respectively, in order to reduce the interference in the neighboring cells caused by the serving RA node, and
   initiating, by the network node, a reduction of the transmit power of the serving RA node to the UE for all Physical Resource Blocks (PRBs) comprising Cell Reference Symbols (CRS) and/or data, except for PRBs used for mobility measurements, wherein a number of the PRBs used for the mobility measurements is set in a system information element.

2. The method according to claim 1, wherein the predefined value is at least 1.5 dB.

3. The method according to claim 1, wherein the determinations of the at least one of the RSRP and the RSRQ are based on a measurement of the at least one of the RSRP and the RSRQ performed by the UE.

4. The method according to claim 1, wherein six center PRBs are used for the mobility measurements.

5. The method according to claim 1, wherein the network node is implemented together with the serving RA node.

6. A network node configured to perform a method for reducing interference in neighboring cells, wherein the network node is configured to:
   operate in a communication network that is adapted to wirelessly serve a User Equipment (UE) via a serving Radio Access (RA) node, obtain measurements on UEs that are not yet in a Discontinuous Reception (DRX) onDuration, obtain a determination of at least one of Reference Signal Received Power (RSRP) and Reference Signal Received Quality (RSRQ) from the serving RA node as received by the UE and a determination of at least one of RSRP and RSRQ from a neighboring RA node as received by the UE, when the UE is connected to the serving RA node, wherein the UE is one of the UEs that are not yet in the DRX onDuration, decide to reduce a transmit power of the serving RA node, when the determined at least one of the RSRP and the RSRQ of the serving RA node is at least a predefined value higher than the determined at least one of the RSRP and the RSRQ of the neighboring RA node, respectively, in order to reduce the interference in the neighboring cells caused by the serving RA node, and initiate a reduction of the transmit power of the serving RA node to the UE for all Physical Resource Blocks (PRBs) comprising Cell Reference Symbols (CRS) and/or data, except for PRBs used for mobility measurements, wherein a number of the PRBs used for the mobility measurements is set in a system information element.

7. The network node according to claim 6, wherein the predefined value is at least 1.5 dB.

8. The network node according to claim 6, wherein six center PRBs are used for the mobility measurements.

9. The network node according to claim 6, wherein the network node is implemented together with the serving RA node.

* * * * *